(12) United States Patent
Kofuji et al.

(10) Patent No.: US 6,908,092 B2
(45) Date of Patent: Jun. 21, 2005

(54) LINK TYPE SUSPENSION FOR VEHICLE SUCH AS MOTORCYCLE

(75) Inventors: Kenji Kofuji, Tokyo (JP); Hirokatsu Kameda, Iwata-gun (JP)

(73) Assignees: Honda Giken Kogyo Kabushiki Kaisha, Tokyo (JP); Showa Corporation, Saitama-ken (JP)

( * ) Notice: Subject to any disclaimer, the term of this patent is extended or adjusted under 35 U.S.C. 154(b) by 0 days.

(21) Appl. No.: 10/646,751

(22) Filed: Aug. 25, 2003

(65) Prior Publication Data

US 2004/0140644 A1 Jul. 22, 2004

(30) Foreign Application Priority Data

Aug. 26, 2002 (JP) ........................................ 2002-245856

(51) Int. Cl.⁷ .............................................. B62K 21/04
(52) U.S. Cl. ...................................... 280/276; 180/219
(58) Field of Search ................................. 280/275–277, 280/279; 180/219, 227

(56) References Cited

U.S. PATENT DOCUMENTS

| | | | | |
|---|---|---|---|---|
| 5,431,426 A | * | 7/1995 | Ijams et al. | 280/276 |
| 5,855,388 A | * | 1/1999 | Brewer | 280/288.4 |
| 5,899,478 A | * | 5/1999 | Woodside | 280/276 |
| 6,036,211 A | * | 3/2000 | Nohr | 280/276 |
| 6,155,370 A | * | 12/2000 | Iwai et al. | 180/222 |
| 6,164,675 A | * | 12/2000 | Pickering | 280/277 |
| 6,357,775 B1 | * | 3/2002 | Iwai et al. | 280/276 |
| 6,488,300 B2 | * | 12/2002 | Ito et al. | 280/276 |

FOREIGN PATENT DOCUMENTS

| | | |
|---|---|---|
| JP | 49-1162 | 1/1974 |
| JP | 11-091671 A | 4/1999 |
| JP | 2000-159170 A | 6/2000 |
| JP | 2000-159171 A | 6/2000 |
| JP | 2000-159177 A | 6/2000 |
| JP | 2000-159178 A | 6/2000 |
| JP | 2000-168666 A | 6/2000 |
| JP | 2001-225778 A | 8/2001 |
| JP | 2001-225780 A | 8/2001 |

* cited by examiner

Primary Examiner—Lesley D. Morris
Assistant Examiner—L. Lum
(74) Attorney, Agent, or Firm—Birch, Stewart, Kolasch & Birch, LLP (57) ABSTRACT

A front suspension for supporting a front wheel of a vehicle having a frame, the front suspension including a front fork which has a pair of tines, and which is supported by the frame, a pair of supporting arms, a bottom bridge, a cushion arm, a pair of push rods, first and second cushion units which are arranged in the right-and-left direction, and which are arranged between and connected to an upper portion of the front fork and the cushion arm, a single spring for supporting a load exerted on the front wheel; and a single damper for damping a vibration due to the single spring. The single spring is housed in the first cushion unit, and the single damper is housed in the second cushion unit. The structure of each of the cushion units can be simplified, and the diameter of each of the cushion units can be made smaller.

7 Claims, 11 Drawing Sheets

LINK TYPE SUSPENSION FOR VEHICLE SUCH AS MOTORCYCLE

This nonprovisional application claims priority under 35 U.S.C. § 119(a) on Patent Application No(s). 2002-245856 filed in JAPAN on Aug. 26, 2002, which is(are) herein incorporated by reference.

BACKGROUND OF THE INVENTION

1. Field of the Invention

The present invention relates to a link type suspension for a vehicle such as a motorcycle.

2. Description of Related Art

As an example of link type front suspensions incorporated into motorcycles, Japanese Unexamined Patent Application, First Publication No. Hei 11-91671 discloses a link type front suspension including two front fork tines which extend in the vertical direction while being arranged in the right-and-left direction for holding a front wheel therebetween, and whose top ends are supported by a vehicle frame in a steerable manner, push rods which are arranged substantially parallel to the front fork tines, front wheel support arms which are rotatably connected to the push rods at the bottom ends of the push rods, respectively, and which rotatably support the axis of the front wheel, and two cushion units which are arranged in the right-and-left direction, and which are disposed between the top ends of the push rods and the top portions of the front fork tines.

The link type front suspension disclosed in the above-mentioned publication has problems such as explained below.

One of the problems is that the front fork tines, which are arranged in the right-and-left direction and at the outsides with respect to the cushion units, must be widely separated from each other because each of the cushion units is configured in the same structure which includes a central damper and a spring surrounding the central damper, and thus the diameter of each of the cushion units is relatively large.

Another problem is that each of the cushion units is relatively heavy because each of the cushion units includes the damper and the spring.

SUMMARY OF THE INVENTION

In view of the above circumstances, an object of the present invention is to provide a link type suspension for a vehicle such as a motorcycle in which the distance between right and left front fork tines can be reduced, and cushion units can be made lighter.

In order to achieve the above object, the present invention provides a front suspension for supporting a front wheel of a vehicle having a frame, the front suspension including: a front fork having a pair of tines arranged in the right-and-left direction of the vehicle, and rotatably supported at a front end of the frame; a pair of supporting arms, an end of each supporting arm being rotatably connected to the bottom end of each of the tines and the other end of each supporting arm rotatably supporting the front wheel; a bottom bridge firmly connecting the tines to each other at substantially middle portions of the tines; a cushion arm rotatably connected to the bottom bridge in a manner movable in the vertical direction; a pair of push rods, the bottom end of each push rod being rotatably connected to a middle portion of each of the supporting arms and the upper end of each of the push rod being rotatably connected to the cushion arm; first and second cushion units arranged in the right-and-left direction, and disposed between and connected to the upper portion of the front fork and the cushion arm; a single spring for supporting a load exerted on the front wheel; and a single damper for damping a vibration due to the single spring, wherein the single spring is housed in the first cushion unit, and the single damper is housed in the second cushion unit.

In this case, because the first cushion unit and the second cushion unit arranged in the right-and-left direction are respectively provided with functions that differ from each other, i.e., the first cushion unit houses only a spring and the second cushion unit houses only a damper, the structure of each cushion unit can be simplified. Moreover, because the diameter of each cushion unit can be made smaller, the right and left front fork tines, which are disposed at the outsides with respect to the cushion units, can be arranged with a shorter distance therebetween, and also the cushion units may be made lighter.

The above front suspension may further include an upper bracket for supporting the upper ends of the first and second cushion units, the upper bracket being attached to the upper portion of the front fork. The upper bracket may include: a flat plate portion arranged in a substantially horizontal state and having therein a pair of through holes extending in a substantially vertical direction; and projecting portions disposed near the pair of through holes and projecting toward the top of the vehicle from the flat plate portion. The upper ends of the first and second cushion units may be connected to the projecting portions in such a manner that the first and second cushion units are respectively inserted into the through holes from the bottom of the vehicle.

In this case, because the upper bracket for supporting the upper ends of the first and second cushion units is provided with the projecting portions projecting toward the top of the vehicle, and the upper ends of the first and second cushion units are connected to and supported by the projecting portions, cushion units having a relatively long operation stroke can also be installed. Moreover, because the cushion units can be fixed just by inserting the cushion units into the through holes from the bottom of the vehicle, and by connecting the upper ends thereof to the projecting portions, the time for installation can be reduced.

In the above front suspension, the first and second cushion units may be respectively covered by covers having the same appearance.

In this case, the first and second cushion units look the same even though the first and second cushion units have functions that differ from each other; therefore, the first and second cushion units will not give unusual sensations.

The above front suspension may further include an auxiliary spring which is smaller than the main spring. In this case, the main spring may preferably be housed in the first cushion unit, and the single damper and the auxiliary spring may preferably be housed in the second cushion unit.

According to the above configuration, the structure of the first cushion unit is simple because the first cushion unit only houses the main spring. The second cushion unit includes the auxiliary spring in addition to the damper; however, because the auxiliary spring is smaller than the main spring, the diameters of both the first and second cushion units can be reduced compared with a conventional cushion unit. Accordingly, the right and left front fork tines, which are disposed at the outsides with respect to the cushion units, can be arranged with a shorter distance therebetween.

The present invention further provides a suspension for supporting a wheel of a vehicle having a frame, the suspension including: a fork having a pair of tines arranged in the right-and left direction of the vehicle, and connected to the frame; a pair of supporting arms, an end of each supporting arm being rotatably connected to the bottom end of each of the tines and the other end of each supporting arm rotatably supporting the front wheel; at least one pair of links, an end of each link being rotatably connected to each of the supporting arms so as to move in accordance with vertical movement of the wheel; first and second cushion units disposed between and connected to an upper portion of the fork and the other end of the link; a single spring for supporting a load exerted on the front wheel; and a single damper for damping a vibration due to the single spring, wherein the single spring is housed in the first cushion unit, and the single damper is housed in the second cushion unit.

In this case, as in the case of the aforementioned front suspension, because the first cushion unit and the second cushion unit arranged in the right-and-left direction are respectively provided with functions that differ from each other, i.e., the first cushion unit houses only a spring and the second cushion unit houses only a damper, the structure of each cushion unit can be simplified. Moreover, because the diameter of each cushion unit can be made smaller, the right and left front fork tines, which are disposed at the outsides with respect to the cushion units, can be arranged with a shorter distance therebetween, and also the cushion units may be made lighter.

DETAILED DESCRIPTION OF THE INVENTION

A motorcycle having a first embodiment of a link type suspension according to the present invention will be explained below with reference to the drawings. Note that, in the following descriptions, directions such as a front-and-rear direction and a right-and-left direction are defined with respect to a vehicle body.

Figure 1:
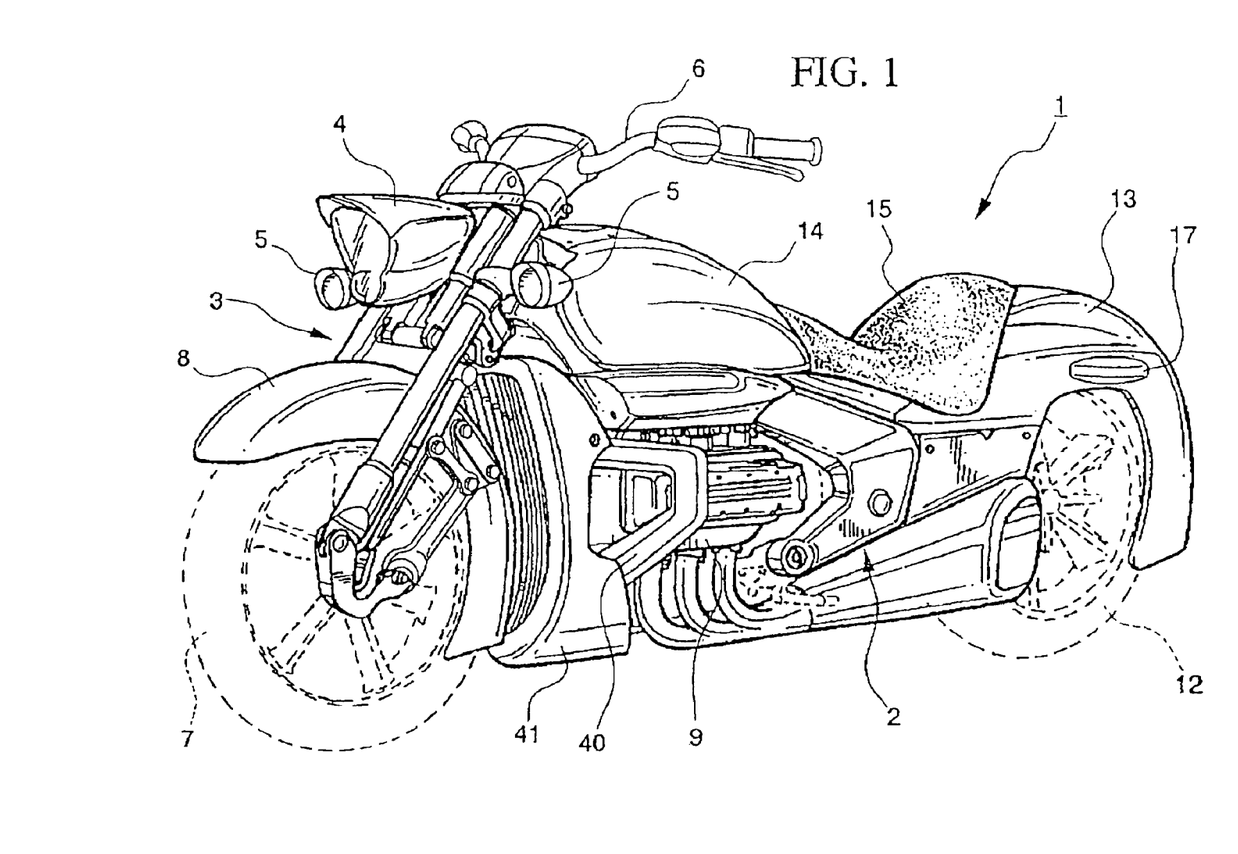
FIG. 1 shows a first embodiment of the present invention, which is a perspective view showing a motorcycle including a link type front suspension according to the present invention.
Figure 2:
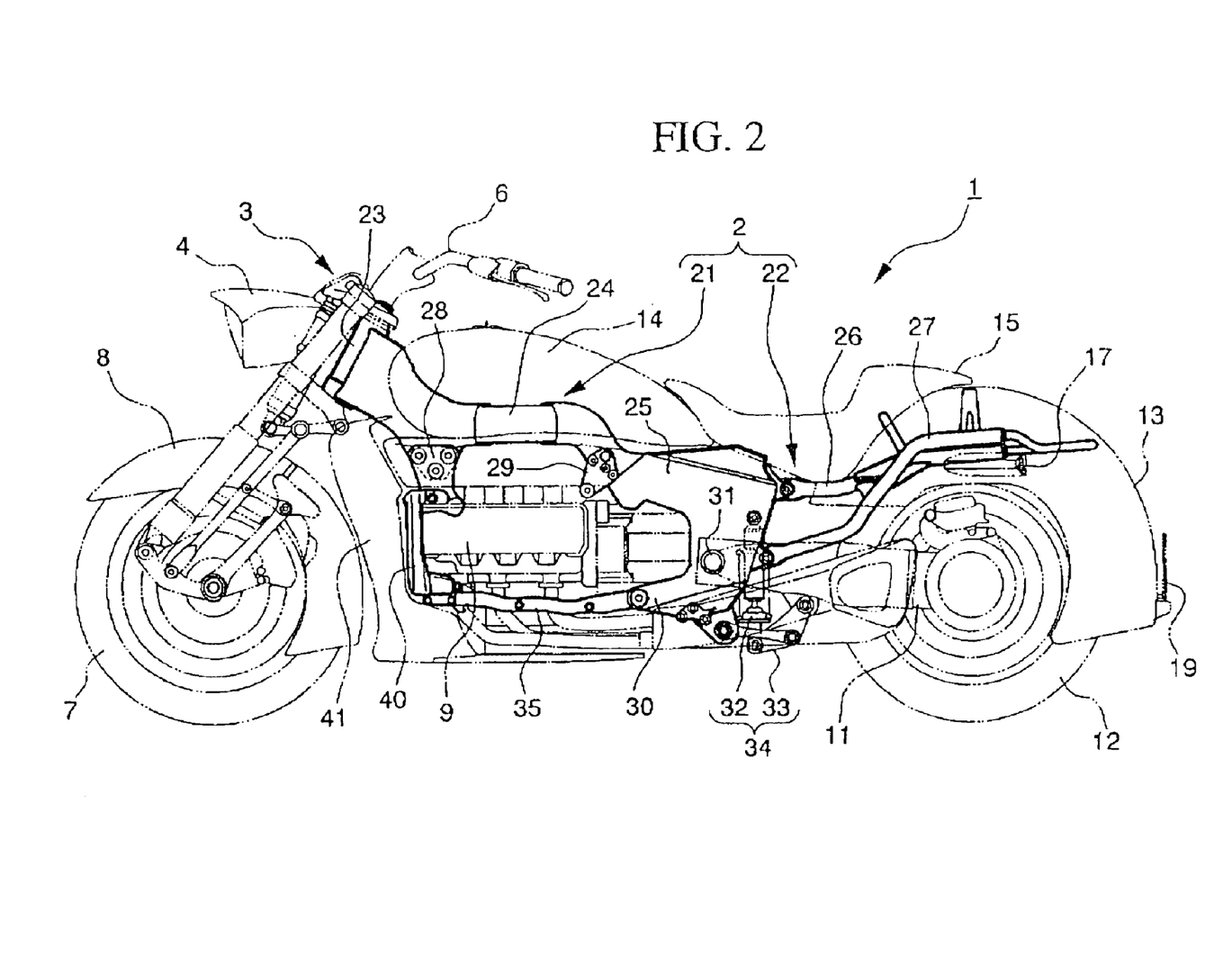
FIG. 2 shows the first embodiment of the present invention, which is a side view showing the motorcycle including the link type front suspension according to the present invention.

FIG. 1 is a perspective view showing the entirety of the motorcycle having the link type front suspension according to the present invention, and FIG. 2 is a side view showing the motorcycle.

The motorcycle 1 is of a so-called American type, and includes a vehicle frame 2, a link type front suspension 3 which is rotatably supported at a front end of the vehicle frame 2, a headlight 4 which is attached to an upper portion of the link type front suspension 3, two front direction indicators 5 which are arranged in the right-and left direction, and which are attached to portions of the link type front suspension 3 at a level lower than the headlight 4, and a steering handle 6 which is attached to the upper end of the link type front suspension 3, and which is disposed at an upper position with respect to the front portion of the vehicle body.

Moreover, the motorcycle 1 includes a front wheel 7 which is rotatably supported by the link type front suspension 3, a front fender 8 which is supported by the link type front suspension 3 in order to cover the upper side of the front wheel 7, an engine 9 which is supported by the vehicle frame 2, a rear swing arm 11 which is supported by the vehicle frame 2 at a rear portion of the vehicle body so as to be swingable about an axis extending the right-and-left direction, a rear wheel 12 which is rotatably supported at the rear end of the rear swing arm 11, and which is rotated by the power of the engine 9, a rear fender 13 which is supported by the vehicle frame 2 in order to cover the upper side of the rear wheel 12.

Furthermore, the motorcycle 1 includes a teardrop-shaped fuel tank 14 which is disposed at an upper portion of the vehicle frame 2, a main seat 15 which is disposed backward with respect to the fuel tank 14 in order to allow a rider to be seated, two rear direction indicators 17 which are arranged in the right-and left direction, and which are attached to rear portions of the rear fender 13, and a license plate attachment 19 which is attached at a rear end of the rear fender 13.

The vehicle frame 2 includes a front frame 21 disposed in the front and a rear frame 22 disposed in the rear. The front frame 21 includes a head pipe 23 which is disposed at a front end of the front frame 21, two upper frames 24 which branch in the right and left from the head pipe 23, extend downward and backward, and further extend horizontally and backward, a down frame 25 including two plates arranged in the right-and-left direction, which are respectively welded to rear ends of the upper frames 22, and which extend, from the rear ends of the upper frames 22, slightly downward and backward, further extend horizontally and backward, further extend downward, and further extend forward at the bottom thereof, so as to exhibit a substantially U-shape in a side view, and connecting members for connecting the two plates arranged in the right-and-left direction to each other. The rear frame 22 includes two upper pipes 26 arranged in the right-and-left direction which are respectively connected to upper-rear ends of the down frame 25, and which extend, from the upper-rear ends of the down frame 25, diagonally upward, and two down pipes 27 arranged in the right-andleft direction which are respectively connected to rear portions of the down frame 25 at a substantially middle height of the down frame 25, and which extend, from the rear portions of the down frame 25, upward and backward so as to be respectively connected to the middle portions of the upper pipes 26, and further extend horizontally and backward.

The engine 9 is a so-called horizontally opposed type engine in which right and left cylinder heads and right and left cylinders are arranged so as to oppose each other. The engine 9 is supported by an engine hanger 28 provided at a lower portion of the upper frame 24, by an engine hanger 29 provided at underside of an upper portion of the down frame 25, and by engine hangers 30 provided at front ends of lower portions of the down frame 25.

The rear swing arm 11 is rotatably supported at a front end base portion thereof by a pivot 31 provided in the down frame 25 so as to be swingable in the vertical direction about the pivot 31. A rear suspension 34, which includes cushion units 32 and link elements 33, is disposed between the rear swing arm 11 and the down frame 25 in order to absorb vibrations exerted on the rear wheel 12 from a road surface.

In FIGS. 1 and 2, reference numeral 35 indicates a side frame which connects the engine 9 to the down frame at the side area with respect to the engine 9, reference numeral 40 indicates an engine guard for protecting the engine, and reference numeral 41 indicates a radiator cover.

Figure 3:
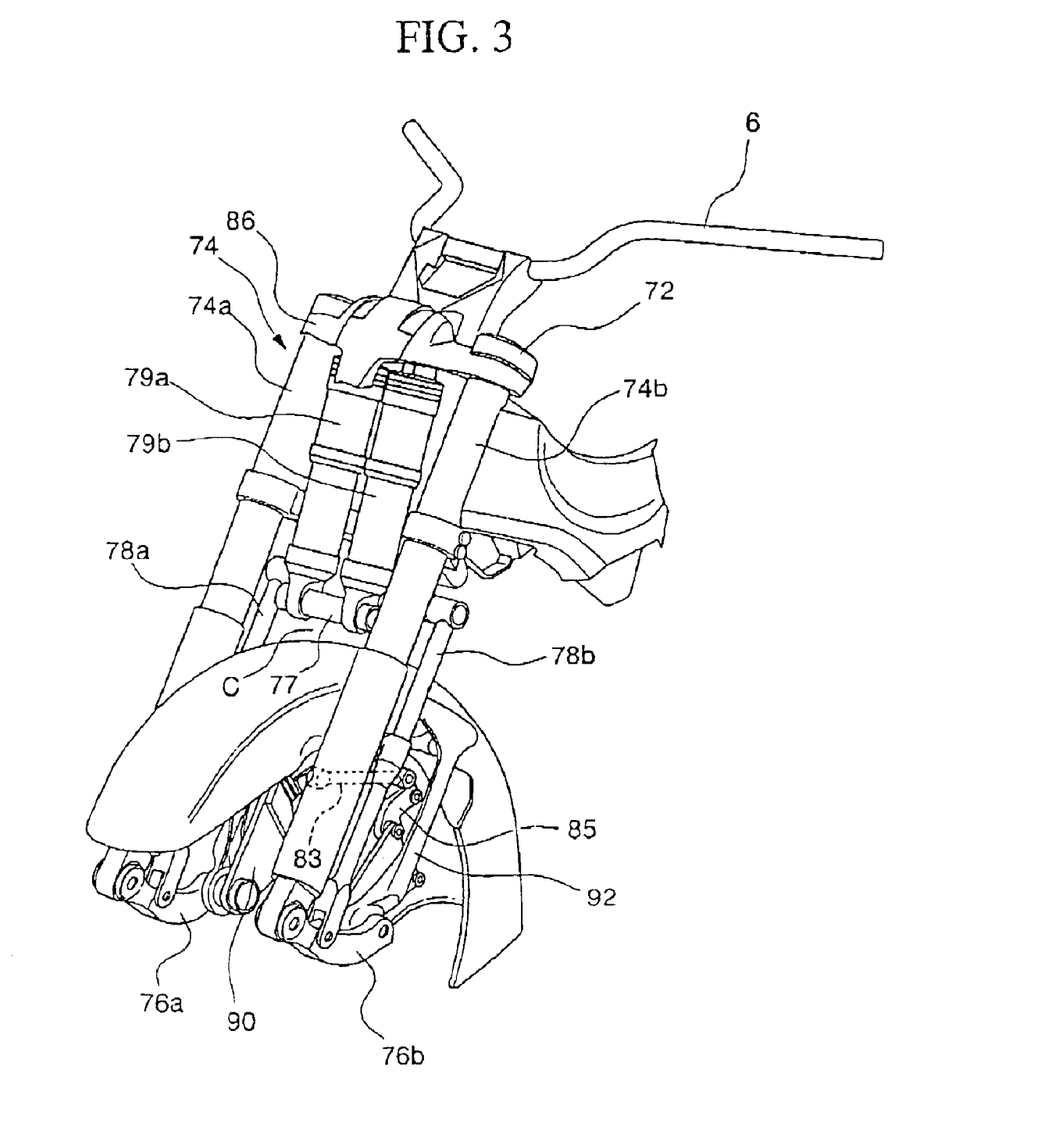
FIG. 3 shows the first embodiment of the present invention, which is a perspective view showing the front portion of the motorcycle including the link type front suspension according to the present invention.
Figure 4:
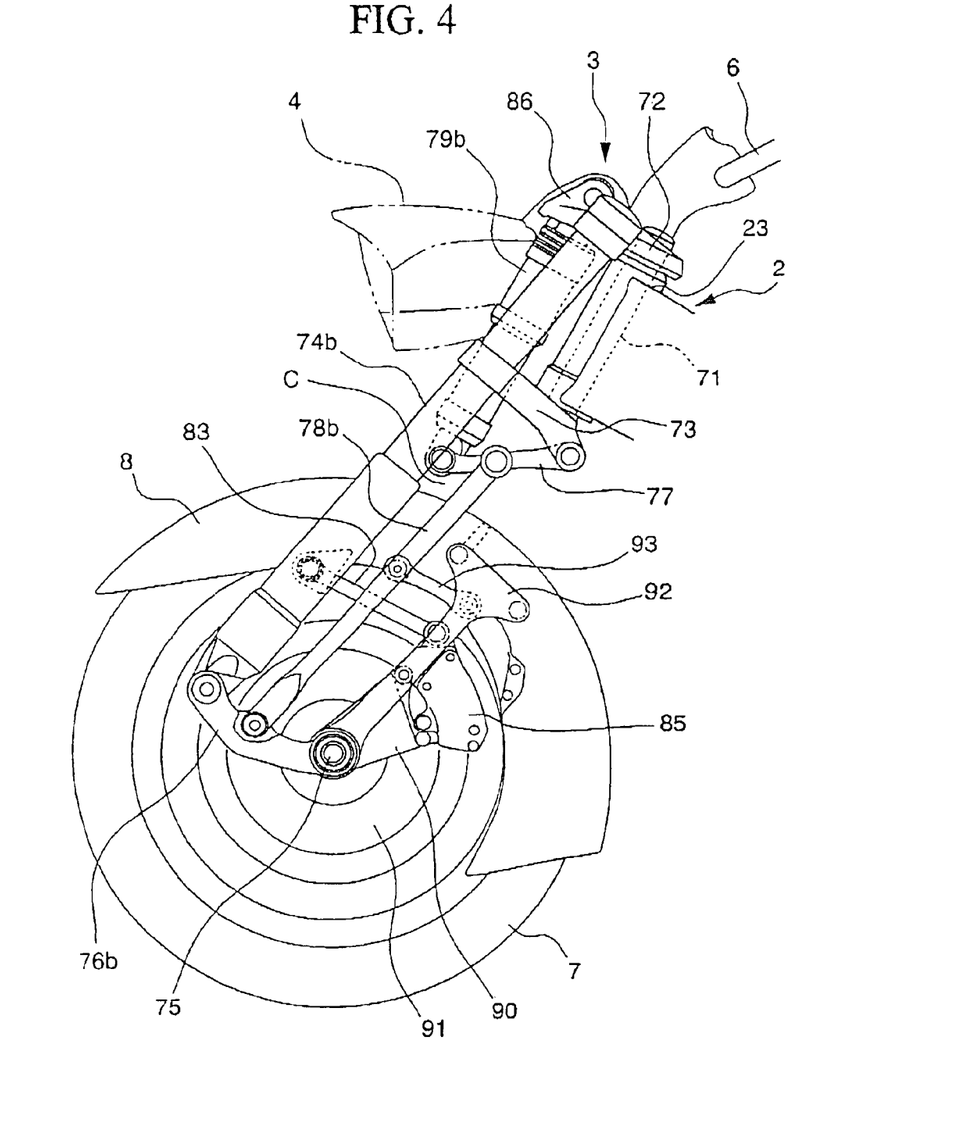
FIG. 4 shows the first embodiment of the present invention, which is a side view showing the front portion of the motorcycle including the link type front suspension according to the present invention.
Figure 5:
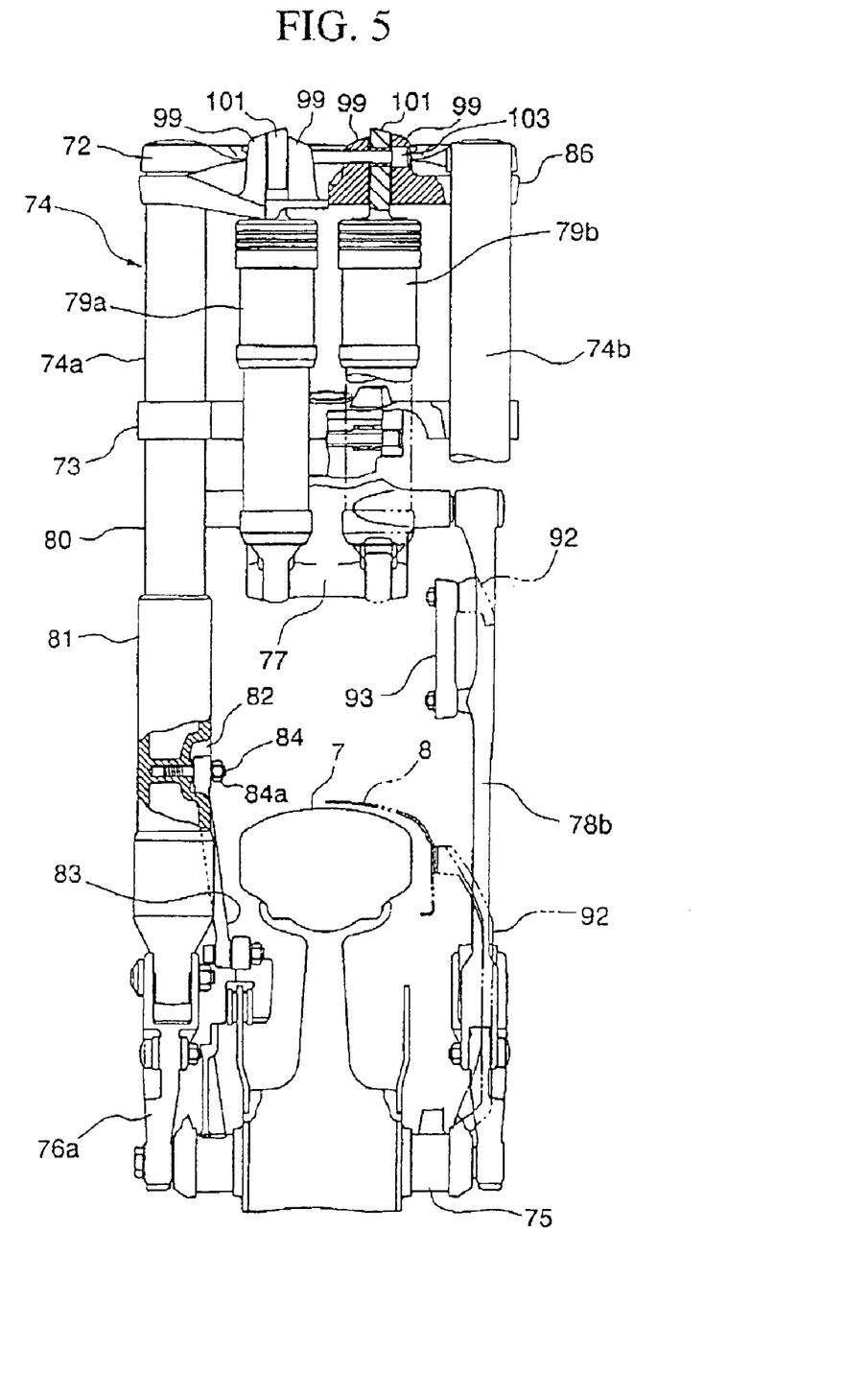
FIG. 5 shows the first embodiment of the present invention, which is a partial cross-sectional front view showing the link type front suspension.

As shown in FIGS. 3 to 5, the link type front suspension 3 includes a steering stem 71 which is accommodated in and rotatably supported by a head pipe 23 attached to the front portion of the vehicle frame 2 so as to be rotatable about an axis of the steering stem 71, a top bridge 72 which is attached to the upper portion of the steering stem 71, a bottom bridge 73 which is attached to the lower portion of the steering stem 71, a front fork 74 which includes two tines 74a and 74b arranged in the right-and-left direction, and whose upper portion is attached to the top bridge 72 and the bottom bridge 73, two front wheel supporting arms 76a and 76b, a front end (an end) of each supporting arm being connected to the lower end of the tine 74a or 74b in a vertically rotatable manner, and a rear end (the other end) of each supporting arm supporting an axle 75 of the front wheel 7 in a manner rotatable in the vertical plane, a cushion arm 77 whose rear end is attached to the bottom bridge 73 in a vertically rotatable manner, two push rods 78a and 78b, the lower end of each push rod being connected to a middle portion of the front wheel supporting arm 76a or 76b in a vertically rotatable manner, and the upper end of each push rod being connected to a middle portion of the cushion arm 77 in a vertically rotatable manner, and first and second cushion units 79a and 79b which are disposed between a front end of an upper bracket 86 and a front end of the cushion arm 77.

Figure 6:
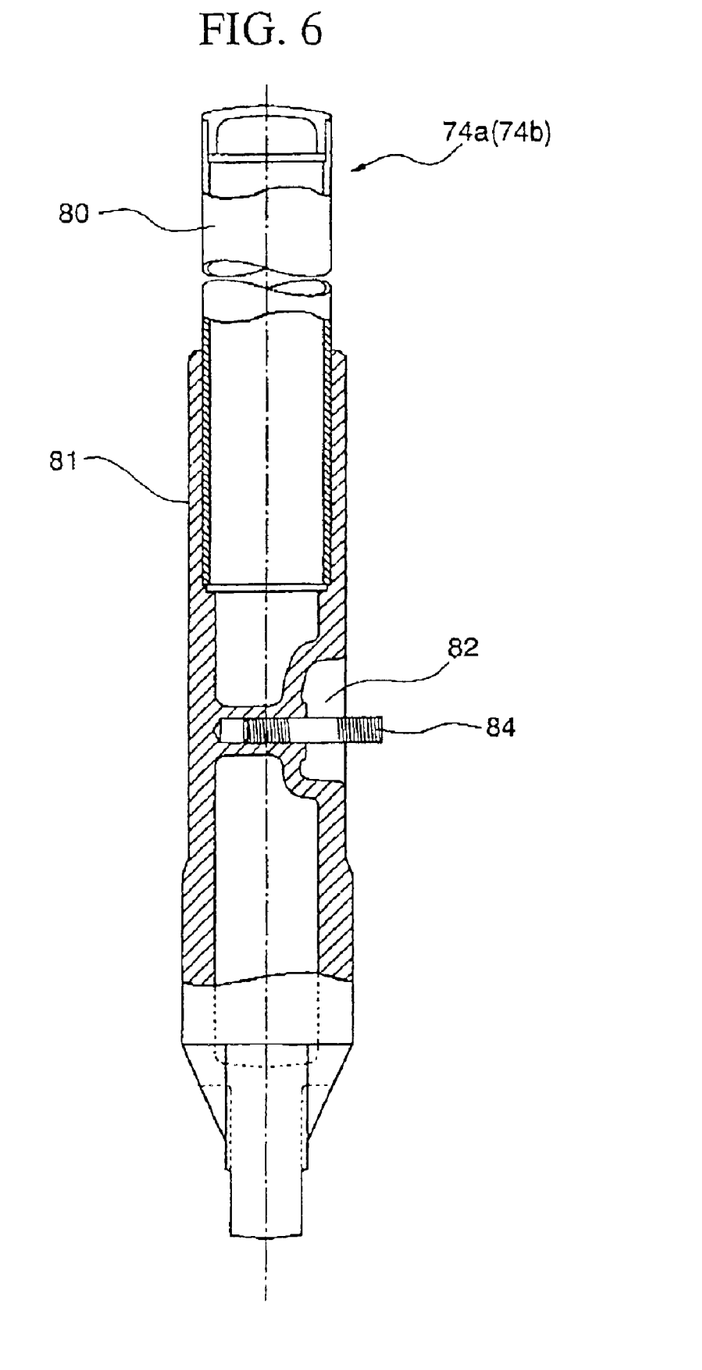
FIG. 6 shows the first embodiment of the present invention, which is a cross-sectional view showing a front fork included in the link type front suspension.

As shown in FIG. 6, each of the two tines 74a and 74b arranged in the right-and-left direction includes two elements, i.e., a pipe 80 which is located an upper portion thereof, and which is attached to the top bridge 72 and the bottom bridge 73, and an axle holder 81 which is located a lower portion thereof. The pipe 80 is accommodated in and fixed to the upper portion of the of the axle holder 81, and one of the front wheel supporting arms 76a and 76b is attached to the bottom portion of the axle holder 81. The axle holder 81 is made by casting so that the shape thereof can be freely determined. A recess 82, which is concave from the surface level, is formed at a portion of the axle holder 81 that is located at the middle length of the axle holder 81 and faces inside (i.e., faces the front wheel 7) as viewed in a state in which the axle holder 81 is installed on the vehicle body. A front end of a torque link 83 is accommodated in the recess 82. A fixing bolt 84, which includes an inner thread to be fixed to the axle holder 81 and an outer thread, is inserted into an engagement hole formed in the front end of the torque link 83, and a nut 84a is engaged with the outer thread of the fixing bolt while sandwiching the torque link 83, so that the torque link 83 is rotatably attached to the axle holder 81 (see FIG. 5).

The rear end of the torque link 83 is rotatably attached to a caliper 85.

As explained above, because the tines 74a and 74b of the front fork 74 are connected to the torque link 83 in such a manner that the recess 82 is formed at the inside surface of each of the tines 74a and 74b so as to be concave, i.e., by forming a portion of each of the tines 74a and 74b facing the front wheel 7 so as to be concave, and by connecting the front end of the torque link 83 using the recess 82, in other words, because a space for connection with the torque link 83 is ensured by forming the recess 82 in the inside surface of each of the tines 74a and 74b, the tines 74a and 74b do not have to be separated from each other for the purpose of connection; therefore, the initially determined positions of the tines 74a and 74b and the distance therebetween can be maintained.

The bottom end of each of the two push rods 78a and 78b arranged in the right-and-left direction is formed in a U-shape, and is connected to the middle portion of the front wheel supporting arm 76a or 76b in a vertically rotatable manner. The upper end of each of the push rods 78a and 78b is connected to one of right and left portions of the cushion arm 77 in a vertically rotatable manner.

The push rods 78a and 78b are disposed behind the two tines 74a and 74b arranged in the right-and-left direction in such a manner that the push rods 78a and 78b are overlapped and covered by the tines 74a and 74b as viewed in a front view.

Figure 9A:
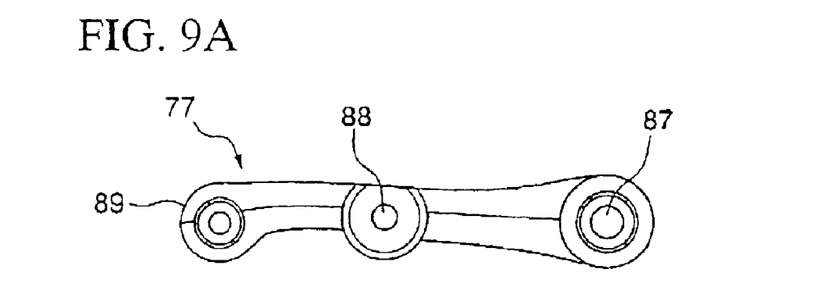
FIGS. 9A and 9B show the first embodiment of the present invention, which are diagrams illustrating a cushion arm included in the link type front suspension.
Figure 9B:
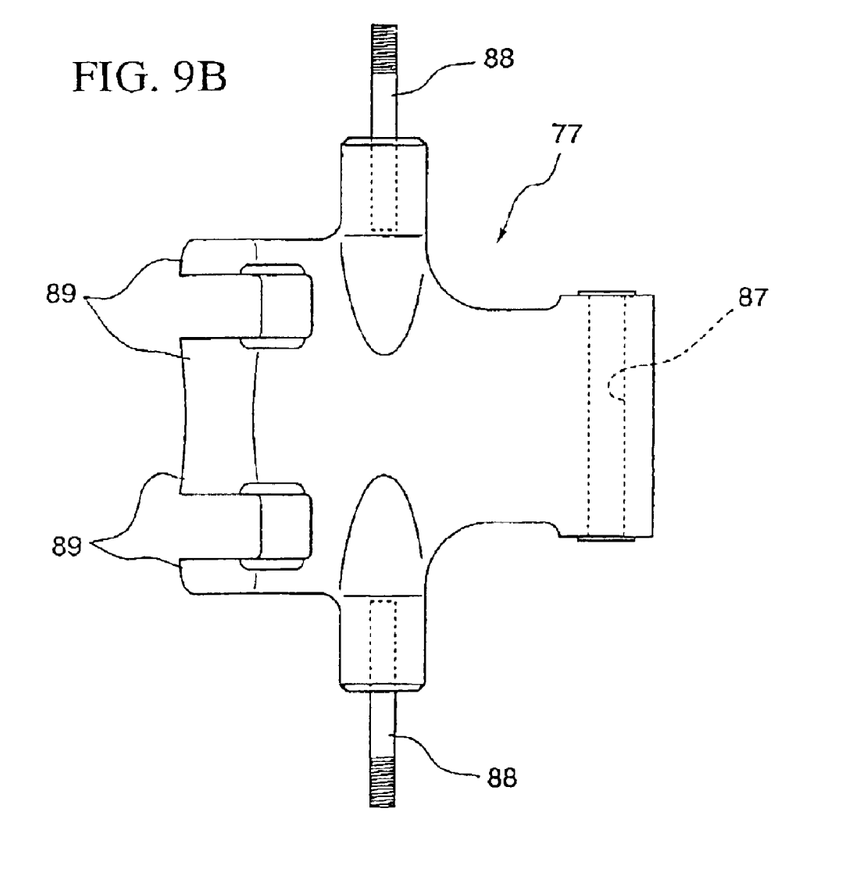
Figures 10A, 10B, 10D:
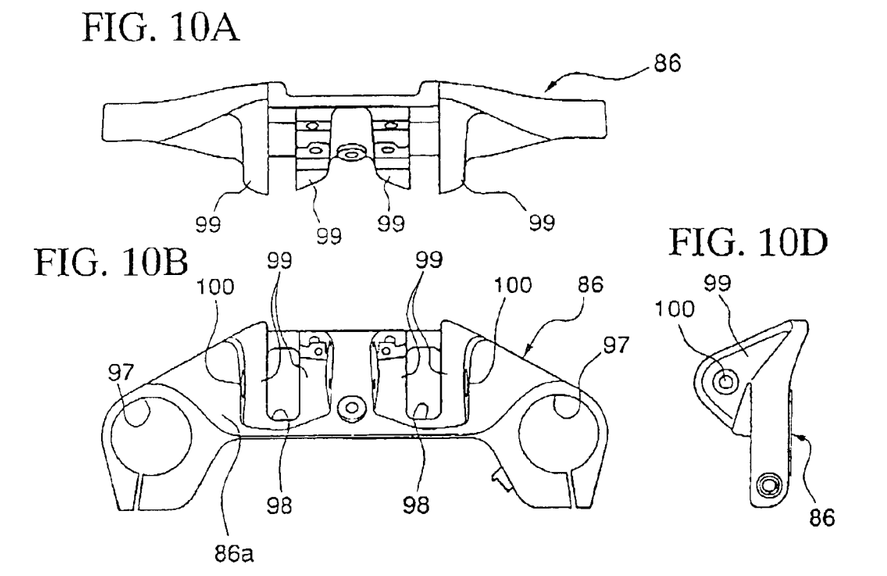
FIGS. 10A to 10D show the first embodiment of the present invention, which are diagrams illustrating an upper bracket included in the link type front suspension.
Figure 10C:
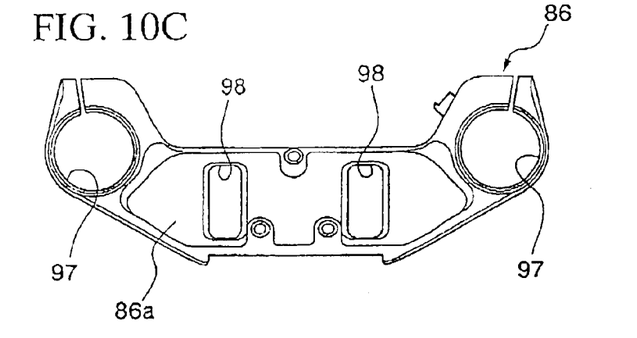

As shown in FIGS. 9A and 9B, the cushion arm 77 is formed in a substantially plate shape overall, and includes a pivot portion 87 which is located at the rear end thereof for allowing the cushion arm 77 to be rotatably supported by the bottom bridge 73, support spindles 88 which respectively extend from side surfaces of middle portions projecting in the right or left direction, and which allow rotatable connection with the push rods 78a and 78b, and U-shaped portions 89 which are located at the front end thereof for allowing rotatable connections with the bottom ends of the first and second cushion units 79a and 79b. The cushion arm 77 is arranged in such a manner that the rear portion thereof is raised with respect to the front portion thereof in order to always ensure a space C between the cushion arm 77 and the front fender 8 (see FIGS. 3 and 4).

By arranging the two push rods 78a and 78b in the right-and-left direction, and by individually and respectively connecting the upper ends of the push rods 78a and 78b to the support spindles 88 extending in the right and left directions from the cushion arm 77 as explained above (see FIGS. 9A and 9B), the space C having an appropriate size and including no elements is formed above the front fender 8 and between the right and left tines 74a and 74b (see FIGS. 3 and 4). During a running operation, this space acts as an inlet for cooling air for the engine, and cooling air for the engine is actively sent to the engine through the space C; therefore, the engine can be preferably cooled.

Moreover, because the push rods 78a and 78b are disposed behind the tines 74a and 74b of the front fork 74, i.e., the push rods 78a and 78b are disposed so as to be overlapped and covered by the tines 74a and 74b as viewed in a front view, more specifically, because the push rods 78a and 78b are disposed in the space behind the tines 74a and 74b, the push rods 78a and 78b will not block cooling air flowing through the space C; therefore, the engine can be ideally cooled in view of this point as well.

A bracket 90 is attached to the axle 75 of the front wheel 7. The caliper 85, which is provided for applying braking force to the front wheel 7 via a disc 91 rotating with the axle 75, is fixed to the bracket 90. The rear end of the torque link 83 is rotatably attached to the front end of the caliper 85. Support stays 92 are attached to the axle 75 of the front wheel 7, and the front fender 8 is supported by the stays 92. A middle portion of each of the support stays 92 is supported by a link 93 disposed between the push rods 78a and 78b, and thus the rotation of the support stays 92 in the vertical direction about the axle 75 is not allowed.

The first and second cushion units 79a and 79b are arranged in the right-and-left direction and between the tines 74a and 74b of the front fork 74. Among the first and second cushion units 79a and 79b, the first cushion unit 79a houses only a spring 94 for supporting a load, and the second cushion unit 79b houses only a damper 95 for damping a vibration due to the spring 94 (i.e., a vibration of the front wheel 7 (see FIGS. 5, 7, and 8).

Figure 7:
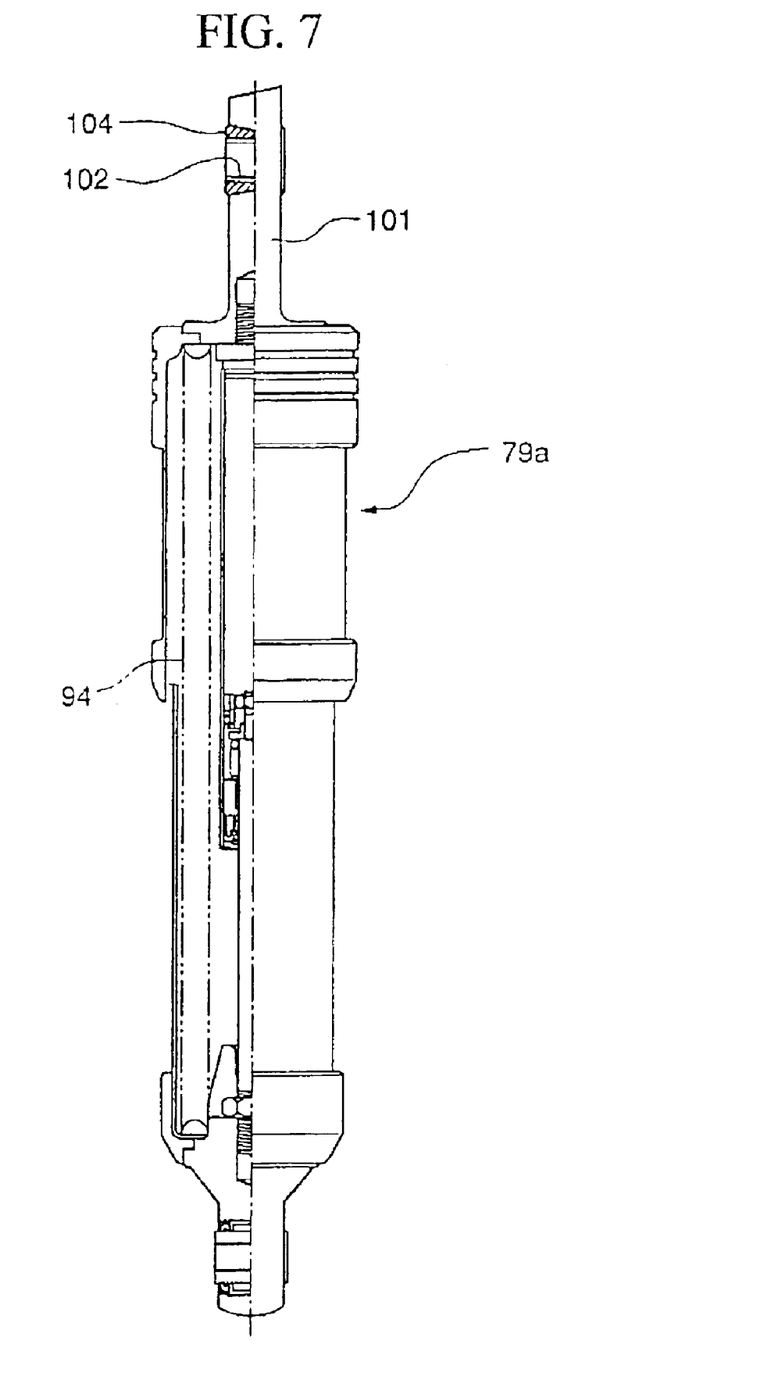
FIG. 7 shows the first embodiment of the present invention, which is a partial cross-sectional view illustrating a first cushion unit included in the link type front suspension.
Figure 8:
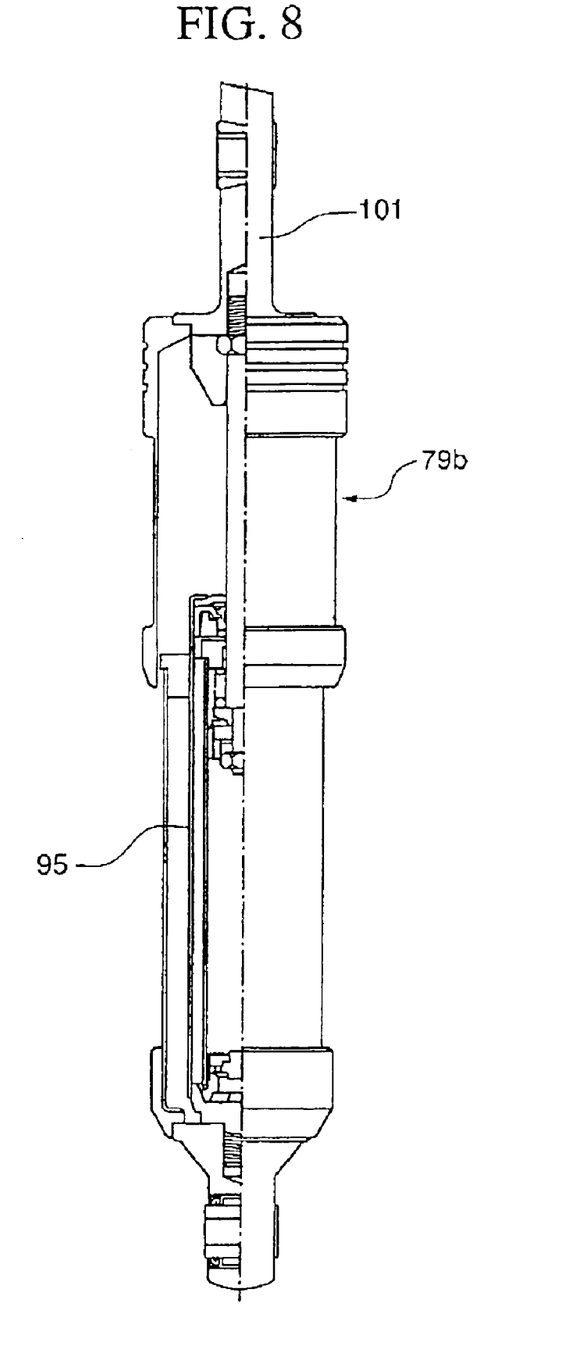
FIG. 8 shows the first embodiment of the present invention, which is a partial cross-sectional view illustrating a second cushion unit included in the link type front suspension.

The two cushion units 79a and 79b arranged in the right-and-left direction are respectively covered by covers having the same appearance. Accordingly, the first and second cushion units 79a and 79b look the same even though the first and second cushion units 79a and 79b have functions that differ from each other; therefore, the first and second cushion units 79a and 79b will not give unusual sensations.

The structure in which the two cushion units 79a and 79b are attached to the upper bracket 86 will be explained. As shown in FIGS. 4 and 10A to 10D, the upper bracket 86 includes a flat plate portion 86a which is arranged substantially horizontally when installed on the vehicle body, and engagement holes 97 which are located the right and left ends of the flat plate portion 86a, respectively, and into which the front fork 74 is to be inserted and fixed. Each of the engagement holes 97 has a split circumference so that the diameter thereof can be changed by being tightened by a bolt. In the middle area of the flat plate portion 86a, there are formed through holes 98 which extend in the vertical direction when installed on the vehicle body, and which are separated from each other in the right-and-left direction by a predetermined distance. Bosses (projecting portions) 99, which project upward with respect the vehicle body, and which include a thread hole 100 into which a bolt is to be inserted, are formed at the right and left of each of the through holes 98.

The first and second cushion units 79a and 79b are attached to the upper bracket 86 in a vertically rotatable manner through the steps of inserting plate-shaped engagement portions 101, which are formed at the upper ends of the first and second cushion units 79a and 79b, into the through holes 98 of the upper bracket 86 from the bottom of the vehicle body, aligning engagement holes 102 formed in the engagement portions 101 and the thread holes 100 formed in the bosses 99, inserting bolts 103 into the engagement holes 102 and the thread holes 100, and tightening the bolts 103 (see FIG. 5).

A bushing 104 is provided between the engagement hole 102 formed in the engagement portions 101 of the first cushion unit 79a and the bolt 103 so as to allow swing motion of the first cushion unit 79a (FIG. 7).

Next, the operations of the link type suspension 3 configured as described above will be explained below.

The link type front suspension 3 and the rear suspension 34 are compressed depending on payload such as the weight of the rider and the weight of fuel, and the front wheel 7 moves up and down in accordance with bumps on the road during running. In accordance with the vertical motion of the front wheel 7, the front wheel support arms 76a and 76b vertically swing about the points supported at the bottom ends of the front fork 77, and the swing motion is transmitted to the first and second cushion units 79a and 79b via the push rods 78 and the cushion arm 77.

Accordingly, the first and second cushion units 79a and 79b are compressed and extended, and the vibration of the vehicle body due to bumps on the road can be absorbed by the damping effects of the first and second cushion units 79a and 79b. During a braking operation, the caliper 85 holds the disc 91 in the right-and-left direction, and thereby braking force is applied to the front wheel 7. In this case, the caliper 85 is about to rotate with the disc 91 about the axle 75; however, the rotation of the caliper is not allowed because the caliper 85 is prevented from moving forward due to the torque link 83 which is disposed between the caliper and the front fork 74.

According to the above embodiment of the link type front suspension 3, because the two cushion units 79a and 79b arranged in the right-and-left direction are differentiated from each other in such a manner that one includes the spring 94 for supporting a load, and the other includes the damper 95 for generating a damping force, the diameter of each cushion unit can be made smaller compared with the case in which the cushion units 79a and 79b are of the same structure, i.e., each of the cushion units 79a and 79b includes a spring and a damper. As a result, the distance in the fork 74 needed for accommodating a pair of cushion units does not have to be made great, and the initially determined positions of the tines 74a and 74b of the front fork 74 and the distance therebetween can be maintained.

Moreover, the two cushion units 79a and 79b arranged in the right-and-left direction are differentiated from each other in such a manner that one includes the spring 94 for supporting a load, and the other includes the damper 95 for generating a damping force as described above, the cushion units 79a and 79b can be made lighter.

Furthermore, because the bosses 99 of the upper bracket 86 are formed so as to project upward, and the engagement portions 101 of the cushion units 79a and 79b are attached to the bosses 99, the cushion units 79a and 79b can be disposed as high as possible; therefore, the cushion units 79a and 79b, each of which has a predetermined length, can be disposed between the upper bracket 86 and the cushion arm 77 without shifting the upper bracket 86 upward.

In the above first embodiment, the first cushion unit 79a acting as a spring is disposed in the right of the motorcycle 1, and the second cushion unit 79b acting as a damper is disposed in the left of the motorcycle 1; however, the first cushion unit 79a may be disposed in the left, and the second cushion unit 79b may be disposed in the right.

Next, a second embodiment of the link type front suspension according to the present invention will be explained below. The difference between the first embodiment and the second embodiment is just the second cushion unit.

Figure 11:
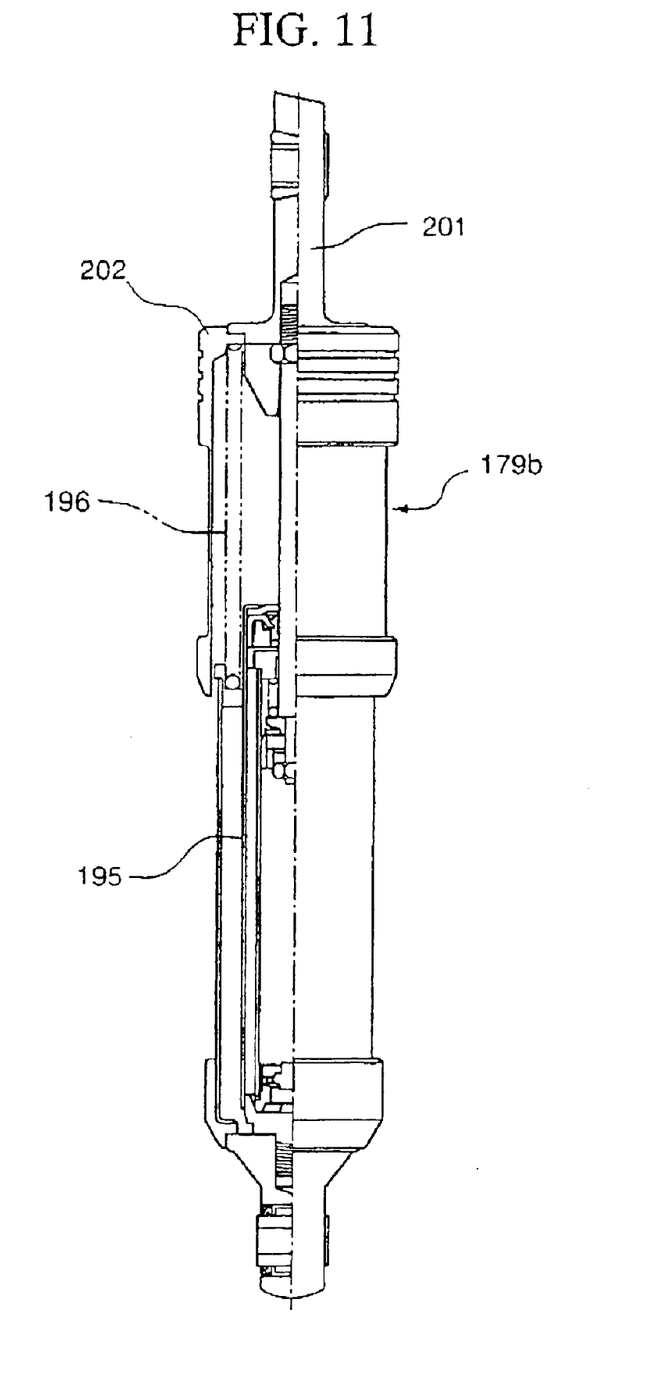
FIG. 11 is a partial cross-sectional view illustrating a second cushion unit included in a second embodiment of the present invention.

FIG. 11 is a partial cross-sectional view showing the second cushion unit 179b in the second embodiment.

The second cushion unit 179b is different from the second cushion unit 79b in the first embodiment, and houses an auxiliary spring 196 in addition to a damper 195. The auxiliary spring 196 is provided for holding an upper cover 202 at an engagement portion 201, and due to this reason, the wire diameter and length of the auxiliary spring 196 are made smaller compared with the main spring 94 housed in the first cushion unit 79a. Accordingly, the second cushion unit 179b mainly acts to generate a damping force even though the second cushion unit 179b includes the auxiliary spring 196, and the outer diameter of the second cushion unit 179b can be smaller than that of a conventional cushion unit including both spring and damper. If the upper cover 202 is connected to the engagement portion 201 using means such as threads, the auxiliary spring 196 is not needed.

As explained above, as in the first embodiment, in the second embodiment as well, the diameter of each of the cushion units can be made smaller, and the distance between the tines 74a and 74b of the front fork 74 can be made smaller compared with a conventional case.

In the second embodiment, the first cushion unit 79a acting as a spring is disposed in the right of the motorcycle 1, and the second cushion unit 179b mainly acting as a damper is disposed in the left of the motorcycle 1; however, the first cushion unit 79a may be disposed in the left, and the second cushion unit 179b may be disposed in the right.

While preferred embodiments of the invention have been described and illustrated above, it should be understood that these are exemplary of the invention and are not to be considered as limiting, and modifications can be made without departing from the spirit or scope of the present invention.

For example, in the above embodiments, the front wheel support arms 76a and 76b are arranged so as to extend forward from the axle 75 of the front wheel 7; however, in addition, the present invention may be applied to a link type front suspension in which front wheel support arms are arranged so as to extend backward from the axle 75 of the front wheel 7.

Moreover, the above embodiments are explained while taking a motorcycle as the example; however, the application of the present invention is not limited to motorcycles, and the present invention may be applied to a three-wheeler, or to a buggy-type four-wheeler.

As explained above in detail, according to the link type front suspension for a vehicle such as a motorcycle of the present invention, because the two cushion units arranged in the right-and-left direction are differentiated from each other in such a manner that one includes the spring for supporting a load, and the other includes the damper for generating a damping force, the structure of each cushion unit can be simplified, and the diameter of each cushion unit can be made smaller compared with the case in which the cushion units are of the same structure, i.e., each of the cushion units includes a spring and a damper. As a result, the right and left front fork tines, which are disposed at the outsides with respect to the cushion units, can be arranged with a shorter distance therebetween, and also the cushion units may be made lighter.

Moreover, according to the link type front suspension of the present invention, the upper bracket for supporting the upper ends of the first and second cushion units is attached to the upper portion of the front fork, the upper bracket includes the flat plate portion arranged in a substantially horizontal state and having therein a pair of through holes extending in a substantially vertical direction, and the projecting portions disposed near the pair of through holes and projecting toward the top of the vehicle from the flat plate portion, and in addition, the upper ends of the first and second cushion units are connected to the projecting portions in such a manner that the first and second cushion units are respectively inserted into the through holes from the bottom of the vehicle; therefore, cushion units having a relatively long stroke can be installed on the vehicle, and the time for installation can be reduced.

What is claimed is:

1. A front suspension for supporting a front wheel of a vehicle having a frame, the front suspension comprising:
   a front fork having a pair of tines arranged in a right-and-left direction of the vehicle, and rotatably supported at a front end of the frame;
   a pair of supporting arms, an end of each supporting arm being rotatably connected to a bottom end of each of the tines and an opposite end of each supporting arm rotatably supporting the front wheel;
   a bottom bridge firmly connecting the tines to each other at substantially middle portions of the tines;
   a cushion arm rotatably connected to the bottom bridge in a manner movable in a vertical direction;
   a pair of push rods, a bottom end of each push rod being rotatably connected to a middle portion of each of the supporting arms and an upper end of each of the push rod being rotatably connected to the cushion arm;
   first and second cushion units arranged in the right-and-left direction, and disposed between and connected to an upper portion of the front fork and the cushion arm;
   an upper bracket for supporting upper ends of the first and second cushion units, the upper bracket being attached to the upper portion of the front fork,
   wherein the upper bracket comprises:
      a flat plate portion arranged in a substantially horizontal state and having therein a pair of through holes extending in a substantially vertical direction; and
      projecting portions disposed near the pair of through holes and projecting toward a top of the vehicle from the flat plate portion, and
   wherein the upper ends of the first and second cushion units are connected to the projecting portions in such a manner that the first and second cushion units are respectively inserted into the through holes from the bottom of the vehicle.

2. The front suspension according to claim 1, wherein the first and second cushion units have functions that differ from each other.

3. The front suspension according to claim 2, further comprising:
   a single spring for supporting a load exerted on the front wheel; and
   a single damper for damping a vibration due to the single spring,
   wherein the single spring is housed in the first cushion unit, and the single damper is housed in the second cushion unit.

4. The front suspension according to claim 1, wherein the first and second cushion units are respectively covered by covers which are alike.

5. The front suspension according to claim 1, further comprising:
   a main spring for supporting a load exerted on the front wheel;
   a single damper for damping a vibration due to the single spring; and an auxiliary spring which is smaller than the main spring, wherein the main spring is housed in the first cushion unit, and the single damper and the auxiliary spring are housed in the second cushion unit.

6. A suspension for supporting a wheel of a vehicle having a frame, the suspension comprising:

a fork having a pair of tines arranged in a right-and left direction of the vehicle, and connected to the frame;

a pair of supporting arms, an end of each supporting arm being rotatably connected to a bottom end of each of the tines and an opposite end of each supporting arm rotatably supporting the wheel;

at least one pair of links, an end of each link being rotatably connected to each of the supporting arms so as to move in accordance with vertical movement of the wheel;

first and second cushion units disposed between and connected to an upper portion of the fork and an opposite end of the link; and an upper bracket for supporting upper ends of the first and second cushion units, the upper bracket being attached to the upper portion of the fork, wherein the upper bracket comprises:

a flat plate portion arranged in a substantially horizontal state and having therein a pair of through holes extending in a substantially vertical direction; and projecting portions disposed near the pair of through holes and projecting toward the top of the vehicle from the flat plate portion, and wherein the upper ends of the first and second cushion units are connected to the projecting portions in such a manner that the first and second cushion units are respectively inserted into the through holes from the bottom of the vehicle.

7. The suspension according to claim 6, further comprising:

a single spring for supporting a load exerted on the wheel; and a single damper for damping a vibration due to the single spring, wherein the single spring is housed in the first cushion unit, and the single damper is housed in the second cushion unit.

* * * * *